(12) United States Patent
Cichielo et al.

(10) Patent No.: US 9,491,315 B2
(45) Date of Patent: *Nov. 8, 2016

(54) SYSTEM AND METHOD OF REMOTE FAX INTERCONNECT TECHNOLOGY

(71) Applicant: ETHERFAX, LLC, Marlboro, NJ (US)

(72) Inventors: Robert N. Cichielo, Asbury, NJ (US); Paul J. Banco, Colts Neck, NJ (US)

(73) Assignee: etherFAX, LLC, Marlboro, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 14/537,554

(22) Filed: Nov. 10, 2014

(65) Prior Publication Data

US 2015/0071422 A1 Mar. 12, 2015

Related U.S. Application Data

(63) Continuation of application No. 13/175,063, filed on Jul. 1, 2011, now Pat. No. 8,897,432.

(60) Provisional application No. 61/360,583, filed on Jul. 1, 2010.

(51) Int. Cl.
*H04M 11/00* (2006.01)
*H04N 1/00* (2006.01)
*H04N 1/44* (2006.01)

(52) U.S. Cl.
CPC ........ *H04N 1/00095* (2013.01); *H04N 1/0022* (2013.01); *H04N 1/00217* (2013.01); *H04N 1/00281* (2013.01); *H04N 1/00302* (2013.01); *H04N 1/44* (2013.01); *H04N 2201/0093* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,249,230 | B1* | 8/2012 | Watts | 379/100.17 |
| 2003/0128402 | A1* | 7/2003 | Tanimoto | 358/402 |
| 2007/0127703 | A1* | 6/2007 | Siminoff | 379/372 |
| 2008/0316654 | A1* | 12/2008 | Aiso | 360/324 |
| 2010/0097634 | A1* | 4/2010 | Meyers et al. | 358/1.15 |

OTHER PUBLICATIONS

"Software Integrates FACSys Fax Server with MCI Fax Services," Optus Software, Inc., Jan. 30, 1998, PRNewswire, 5 pages.

* cited by examiner

*Primary Examiner* — Joseph J Nguyen
(74) *Attorney, Agent, or Firm* — Nixon & Vanderhye P.C.

(57) ABSTRACT

The present invention provides systems and methods for the virtualization, aggregation, and distributed processing of facsimile communications. The Remote FAX Interconnect known as etherFAX® is a system and method that allows for the reception and delivery of information based on cloud computing infrastructure to or from one or more facsimile systems using Internet/web based communication protocols such as HTTP(S) as the transport between a facsimile capable application or hardware and the remotely accessible etherFAX® services.

15 Claims, 5 Drawing Sheets

FAX SERVER MODEL

SYSTEM AND METHOD OF REMOTE FAX INTERCONNECT TECHNOLOGY

CROSS-REFERENCE TO RELATED APPLICATIONS

This patent application is a continuation of application Ser. No. 13/175,063 filed Jul. 1, 2011, and claims benefit of Provisional Patent Application No. 61/360,583, filed Jul. 1, 2010, each of which is hereby incorporated by reference herein in its entirety.

FIELD OF THE INVENTION

The present invention relates generally to FAX (facsimile) communications technology. More particularly, the present invention relates to methods, apparatus, and systems for the remote aggregation of FAX communication interconnect technology employing both packet-switched and traditional telephone networking technologies.

BACKGROUND

1. Field of Invention

The present invention relates to the aggregation of facsimile communications technology, and more particularly, to the enablement of remote access and operations of this technology.

2. Description of Related Art

Facsimile document imaging technology has been commercially available dating back to the early 1980's. Scanning an image into a digital representation and communicating that over the Public Switched Telephone Network (PSTN) via a dedicated hardware device is a well understood and widely used technology. As the popularity of this technology grew and became commonly adopted by business and consumers for rapid distribution of documents and information, to further reduce costs, there was a need to develop technology that provided simple aggregation of facsimile communications into a technology known as a FAX Server (FIG. 1). This technology is described in great detail in such documents as U.S. Pat. No. 5,552,901 (Kikuchi, et al) and Japanese patent 03-044230 (Tadashi). These improvements allowed consumers to centralize facsimile resources on a corporate network within the organization, enabling desktop computing platforms and other multifunction printing and scanning fax products to take advantage of facsimile services without requiring dedicated fax hardware at each station. FIG. 1 shows the conventional deployment of fax server technology to anyone schooled in the art. Briefly, for outgoing documents, fax servers (100) accept documents in a variety of different electronic formats generated by different applications or devices (130,140,150) and potentially converts them to a necessary facsimile format (typically a black and white image) within specialized hardware and software (100, 110) required for subsequent transmittal over telephone devices, networks and services (160,120,170) to at least one peer receiving facsimile system (180). For inbound facsimiles, fax servers (100) receive the inbound facsimile information over telephone devices, networks, and services (160,120,170) from peer facsimile devices (180) and potentially convert and store the received transmission for latter retrieval or forward the received information via a number of different electronic formats, to applications (130,150) such as email, or purpose built devices (140). This technology is also well understood by persons who are schooled in the art.

Fax server technology is not without its own set of limitations and requirements. Traditionally, these fax serves (100) are under the purview of a business's network and/or telecom administrator. This set of individuals must not only possess the correct knowledge for operating these devices, but interfacing the technology to both the local computing network infrastructure (130,140,150) as well as interfacing/provisioning the fax server equipment (110) to the telephone company's appropriate type of PSTN/PBX circuit such as PRI/T1/E1/analog line, etc. (120,160,170). Given these requirements, the total cost of ownership of these systems, including the recurring fees to interconnect with the telephone carrier network (170) may be prohibitively expensive for many organizations, leaving them at a significant disadvantage. Furthermore, with the plethora of newer voice communications options such as Voice over IP, many businesses are opting to use alternative methods for interconnecting their voice services, not all of which meet the stringent timing requirements of a facsimile transmission.

In view of the circumstances and limitations of the prior art, as well as considering the migration by businesses of network resources to cloud computing environments, it would be highly desirable to provide a solution that transparently addresses the characteristics of facsimile services, further reduces the total cost of ownership of these systems, and maintain compatibility with existing fax enable applications (130,150) and devices (140,100) even when deployed over non-traditional telephony networks.

SUMMARY OF CERTAIN EMBODIMENTS OF THE INVENTION

The present invention provides systems and methods for the aggregation of and the distributed processing of facsimile communications.

The Remote FAX Interconnect known as etherFAX® is a system and method that allows for the reception and delivery of information based on cloud computing infrastructure to or from one or more facsimile systems using Internet/web based communication protocols such as HTTP(S) as the transport between a facsimile capable application or hardware and the remotely accessible etherFAX® services.

Aspects of the inventions also provide for the virtualization of facsimile interconnect devices to enable remote aggregation of the physical facsimile interconnect.

Aspects of the inventions also provide the ability for reducing the overhead required for the transmission of the facsimile communications between the etherFAX® services and the fax capable application or devices.

Aspects of the invention also provide a system for secure communication of fax information as well as other management and control data with the etherFAX® system.

It is to be understood that both the foregoing general description and the following detailed description are exemplary and explanatory only, and are not restrictive of the invention as claimed. The accompanying drawings constitute a part of the specification, illustrate certain embodiments of the invention and, together with the detailed description, serve to explain the principles of the invention.

In light of the forgoing information an exemplary embodiment of the invention provides for:

A system and method of facilitating the virtualization of facsimile hardware, the aggregation of facsimile communications hardware in a cloud-computing environment, enabling the facsimile information to traverse at least one data network providing an interconnect between at least one virtualized facsimile interface and the cloud computing environment and have the facsimile information traverse at least one telephony network interconnect between the cloud-computing environment and at least one peer facsimile system, comprising:
  a virtual facsimile interface loosely coupled to a data network configure to communicate facsimile information with a cloud computing environment over the data communications network;
  a cloud-computing environment that has interconnects to the data communications network as well as to at least one telephony network;
  the cloud computing environment also housing facsimile capable hardware that enables communications with at least one peer facsimile system;
  and enabling the communications of facsimile information between the at least one virtualized facsimile interface loosely coupled to the data network and the at least one peer facsimile system loosely coupled to the telephony network through the cloud computing environment;
  using Internet protocols to communicate the facsimile information between the cloud computing environment and the virtualized facsimile interface loosely coupled to the data network and
  using the aggregated facsimile hardware within the cloud computing environment to enable facsimile communications between the cloud computing environment and the at least one peer facsimile system.

A system and method of facilitating the virtualization of facsimile interfaces, the aggregation of facsimile communications hardware in a cloud-computing environment, enabling the facsimile information to traverse at least one data network providing an interconnect between at least one virtualized facsimile interface and the cloud computing environment and have the facsimile information traverse the at least one data network interconnect between the cloud-computing environment and at least a second virtualized facsimile interface, comprising:
  a first virtualized facsimile interface loosely coupled to a data network configure to communicate facsimile information with a cloud computing environment over a data communications network;
  at least a second virtualized facsimile interface loosely coupled to a data network configure to communicate facsimile information with a cloud computing environment over a data communications network;
  the cloud computing environment also housing facsimile capable hardware wherein the cloud computing environment enables communications between the at least the first and the second virtualized facsimile interfaces;
  and enabling the communications of facsimile information between the first virtualized facsimile interface loosely coupled to a data network and the at least second virtualized facsimile hardware loosely coupled to a data network through the cloud computing environment;
  using internet protocols to communicate the facsimile information between the cloud computing environment and the first virtualized facsimile interface and
  using internet protocols to communicate the facsimile information between the cloud computing environment and the at least second virtualized facsimile interface.

BRIEF DESCRIPTION OF THE DRAWINGS

The invention can be more fully understood by reading the following detailed description together with the accompanying drawings, in which like reference indicators are used to designate like elements, and in which.

DETAILED DESCRIPTION OF THE INVENTION

Figure 1:
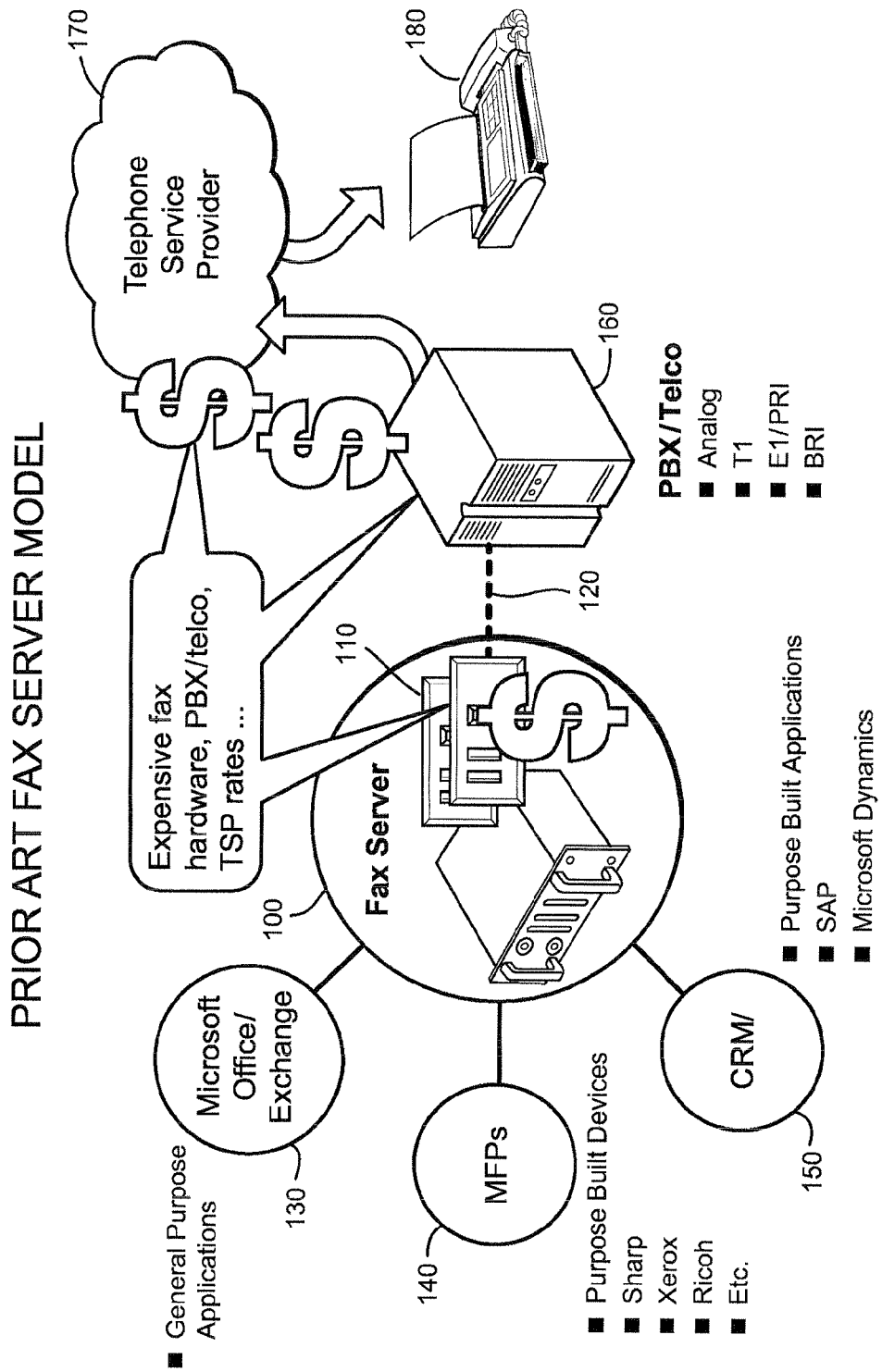
FIG. 1 is a schematic diagram depicting fax application and server technology as is known in the art.

Certain embodiments of the present invention and their advantages may be understood by referring to FIGS. 2-5, wherein like reference numerals refer to like elements, and are describe in the context of a facsimile system. Nevertheless, the present invention is applicable to alternative embodiments and alternate communication technologies such as described in, but not limited to, Internet RFC 4160 (Internet Fax Gateway Requirements and its siblings) or other Fax over IP methodologies, that enable communications between facsimile enabled applications or devices.

Figure 2:
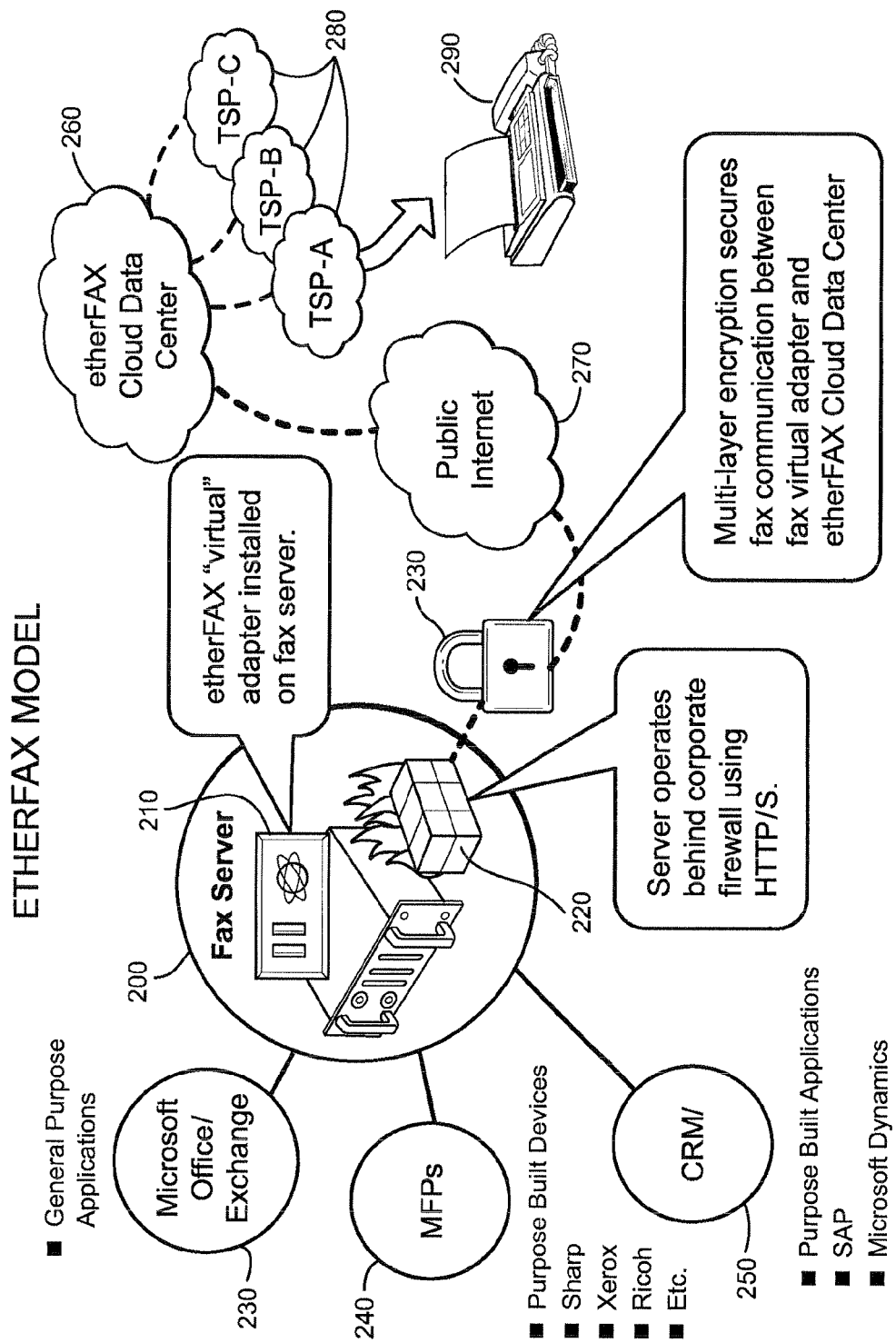
FIG. 2 is a schematic diagram depicting etherFAX® services according to an embodiment of the invention.

FIG. 2 depicts an exemplary embodiment of the Remote FAX Interconnect system known as etherFAX®. Unlike FIG. 1 where high cost components and network access services (100,110,120,160,170) are required at each location a traditional fax server is deployed, the etherFAX® model depicted in FIG. 2 allows for virtualization of the high cost components (210) to be coalesced and access to the network services (280) to be aggregated at a more centralized location (260). However, by maintaining compatibility with the communications logic at the fax server (200) general applications (230) such as email, or purpose build applications (250) and devices (240) can continue to operate without modification. Furthermore, organizations can now potentially collapse their network interconnect requirements to a single network provider or infrastructure, such as the Internet, that can provides both voice and data, therefore reducing overall cost of ownership.

It is to be understood due to organizational or customer requirements, there may be more than one fax server (200) installed that includes more than one virtualized etherFAX® adapter (210), either geographically or logistically dispersed by a organization for a variety of reasons, including, but not limited to redundancy, capacity planning, and/or cost. Furthermore it is to be understood that there may be more than one etherFAX® cloud data center (260) geographically or logistically dispersed for a variety of reason, including, but not limited to redundancy, capacity planning, and/or cost. The more than one etherFAX® cloud data center (260) may also be interconnected via a variety of different data networks, whether that be direct backhauls, wireless, virtual private networks, or other methodologies that enable communications between two cooperating peers. The more than one virtualized etherFAX® adapter (210) may be so configure to allow it to communicate with the more than one etherFAX® cloud data center (260) for a variety of reasons including, but not limited to redundancy, capacity planning, and/or cost.

Considering the aforementioned information, for the sake of brevity and clarity the following exemplary description will enumerate the flow of information between general applications (230), purpose built applications (250) or devices (240) and the at least one facsimile peer system (290) through a single instance of fax server (200) and an etherFAX® cloud data center (260). More intricate arrangements of these components can be easily envisioned by those schooled in the art.

More specifically, when applications (230) and (250), or device (240) want to send facsimile information, they continue to communicate with fax server (200) as they generally would. Upon reception, fax server (200) would then potentially convert the incoming information from the variety of electronic formats into the appropriate facsimile format used for subsequent transmission to at least one peer facsimile system (290). However instead of queuing the information to a locally coupled facsimile hardware, the information is passed to the virtualized etherFAX® adapter (210). The virtual adapter (210) would then instantiate the appropriate communications between itself and the etherFAX® cloud data center (260) through the organizations data network connection. The data communication could take place through many or multiple diverse paths such as over an organization's public Internet connection (270) or potentially through a direct private backhaul between the organization and the etherFAX® cloud data center (260). Additionally these communications could be secured using payload specific security, transport layer security, such as widely accepted IETF SSL/TLS standards, or passed through industry standard virtual private network (VPN) tunnel such as IPSec. It is to be appreciated that anyone or more of these security methodologies may be combined to provide a layered security-in-depth approach for sensitive communications.

Once the communications is instantiated between the virtualized etherFAX® adapter (210) and the etherFAX® cloud data center (260), the facsimile information is transferred to the etherFAX® cloud data center (260) for subsequent transmission to the at least one peer facsimile system (290). Upon receipt of the facsimile information, the etherFAX® cloud data center (260) allocates the necessary resources needed to communicate the fax information onto its ultimate destination(s), potentially over the at least one of its telephony service providers (280). Of note, the remote facsimile communication hardware located at etherFAX® cloud data center (260), actively monitors and potentially recording the progress of the communications checking page progress, connect time, remote facsimile CSID (caller subscriber id), while in transit. Upon such successful completion of the transmission to the at least one peer facsimile systems (290), a success status may be returned through the data network (230,270) to fax server (210) signaling completion of the request. If an error conditions occurs during transmission of the fax information to the at least one peer facsimile system (290), different scenarios may occur based on error status, the etherFAX® account parameters, the operations of the requesting application (230, 250), device (240), or the fax server (200). The most basic scenario is that an error status is returned back through the data network (230,270) to fax server (210) which may then be propagated back to the originating device (240) or application (230,250). Base on the error status returned, the application or device may then have the ability to resubmit the request to retransmit the information to the at least one peer facsimile system (290) through fax server (200).

Another alternative embodiment is for the etherFAX® cloud data center (260) to retry sending the facsimile information automatically based on account settings and/or error status. The retry logic may be different due to the circumstances of the error condition. In one scenario, if the connection to the at least one facsimile peer system (290) was establish and a portion of the information was successfully transmitted, the etherFAX® cloud data center (260) may elect to begin retransmission at an intermediate portion of the information stream. This normally happens if a multi-page document is submitted for transmission and only at least one of the pages was successfully communicated. In this case the etherFAX® cloud data center (260) may elect to resume or restart the communication with the at least one peer facsimile system (290) at the beginning of the page or at the point where the error occurred. Alternatively, the etherFAX® cloud data center (260) may elect to resend the entire document based on account configuration parameters or error status condition (i.e. remote system out of paper, etc.).

Yet another exemplary embodiment exists if the at least one peer facsimile system is no longer available at its current network identifier. In this case, no matter what the retransmit logic actions are, the communications will not succeed to the at least one facsimile peer system (290), thus a catastrophic error may be returned through the data network to initiating fax server (200) and ultimately the originating application (230,250) or device (240).

It is to be appreciated that other alternative embodiments of handling successful or error status conditions may be applied without departing from the spirit of the exemplary embodiment of the present invention.

Reception of facsimile information from the at least one facsimile peer system (290), through the etherFAX® cloud data center (260) to fax server (200) follows a similar but reverse path to the sending of facsimile information. Specifically, when the at least one facsimile peer system (290) wants to send facsimile information to fax server (200), the at least one facsimile system (290) would establish the appropriate communications connection through the at least one of the telephony service providers (280) to the etherFAX® cloud data center (260). Based on an incoming network identifier associated with the incoming fax information, the etherFAX® cloud data center (260) looks up the appropriate etherFAX® account information to determine the organization the facsimile information is destined for. As described previously, there are maybe a multitude of data communications paths (270) and/or security methodologies (230) employed to enable the communications of the facsimile information back to the correct virtualized etherFAX® adapter (210) coupled to fax server (200). Upon successful transmission of the facsimile information to the fax server (200) from the etherFAX® cloud data center (260), the fax server may convert the inbound information to a variety of formats suitable for subsequent consumption by general applications (200), purpose built applications (250), and/or devices (240). Alternatively, as exemplified by prior art, fax server (200) may queue the incoming fax information for later retrieval if the general applications (200), purpose built applications (250), and/or devices (240) are disconnected or are not communicating with the fax server (200) for any reason.

Errors may also occur during any stage of the reception process. For instances, it is possible that during communications between the at least one facsimile peer system (290)

and the etherFAX® cloud data center (260), a disruption of service may occur over any of the telephony providers (280). Different scenarios may occur based on error status, the etherFAX® account parameters, or when an error occurs during transmission. If for example, appropriate communications could not be established between the at least one facsimile system (290) and the etherFAX® cloud data center (260). This error may be handled locally by the etherFAX® cloud data center (260) as it might not have enough information to determine what etherFAX® account the inbound connection is for. However, if a partial transmission was received for a given transaction, enough information may be received to allow the etherFAX® cloud data center (260) to determine the fax server (200) the communications was destined for. In this instance the error status for that operation may be propagated back to the determined fax server (200), and ultimately to the general applications (200), purpose built applications (250), and/or devices (240), thus enabling the appropriate corrective action to take place.

It is to be appreciated that, in both the send and receive cases, the communications between the fax sever (200) and the general applications (200), purpose built applications (250), and/or devices (240), are not modified, thus leaving the communications path and logic, as well as the configuration of policy and/or business rules logic of fax server (200) operations to the organization. As such the organization maintains internal control over the distribution of the facsimile information without relinquishing these services to the etherFAX® cloud data center (260).

In an alternate embodiment, and as indicated previously, there may be a multitude of fax servers (200) communicating with an etherFAX® cloud data center (260). For the sake of clarity, additional fax servers (200) were not outlined in FIG. 2. To ones schooled in the art, it would be obvious that additional advantages main be gained. For example, fax server (200) and a second fax server using the mnemonic (200a) belong to the same organization, but geographically dispersed. If fax server (200) and fax server (200a) both availed themselves of the services of an etherFAX® cloud data center (260), the facsimile communications may never need to traverse telephony service providers (280) networks. In this instance, the facsimile communications could be routed internally within an etherFAX® cloud data center (260), potentially increasing the reliability, and further reducing the costs, overhead, and/or time associated with communicating facsimile information. A further benefit that may be realized is that the communication of the facsimile information could done securely between fax server (200) and the at least one additional fax server (200a), thus provide an enhanced level of service not available with traditional facsimile communications. It is also to be appreciated that the multitude of fax servers (200) may be owned and operated across organizational boundaries. In such a scenario, these enhanced level of services would be available to the organizations associated with the etherFAX® service.

In yet another exemplary embodiment, and as indicated previously, there may be more than one etherFAX® cloud data center (260), geographically or logistically dispersed for a variety of reasons, including, but not limited to redundancy, capacity planning, and/or cost. For the sake of clarity, additional etherFAX® cloud data centers (260) were not outlined in FIG. 2. To ones schooled in the art, it would be obvious that additional advantages main be gained in such a configuration. Consider the example of an etherFAX® cloud data center (260) loosely coupled to an additional etherFAX® cloud data center using the mnemonic (260a) that are geographically dispersed. In this case etherFAX® cloud data center (260) and etherFAX® cloud data center (260a) may be loosely coupled to the same or different regional telephony service providers (280). When a facsimile communications is instantiated between fax server (200) and etherFAX® cloud data center (260), etherFAX® cloud data center (260) could determine based on the destination of the facsimile information to the at least one facsimile peer system (290), that it may be better to hand off the communications to etherFAX® cloud data center (260a), using its regional interconnects with telephony service providers (280). This could result in lower costs, as only regional tariff rates would be charge for the communications, instead of long distance charges. Other reasons also exist. If the inbound facsimile communications is marked with a high priority level of service (i.e. marked urgent), and all the local telephony resources of etherFAX® cloud data center (260) are being consumed, handing off the communications to etherFAX® cloud data center (260a) may allow the communications to be completed in a more timely manner. It is to be appreciated that this functionality could be achieved in a multitude of ways, including but not limited to being handled entirely within the intercommunications between etherFAX® cloud data centers (260, 260a) or having etherFAX® cloud data center (260) redirect the fax server (200) to instantiate the appropriate communications between itself and etherFAX® cloud data center (260a).

It is also to be appreciated that other alternative embodiments and reasons for enabling intercommunications between etherFAX® cloud data center (260) and the at least one additional etherFAX® cloud data center (260a), include, but not limited to the secure communications of facsimile information or not routing the facsimile information between fax server (200) and the at least one additional fax server (200a) via telephony service providers (280), may be applied without departing from the spirit of the exemplary embodiment of the present invention.

Figure 3:
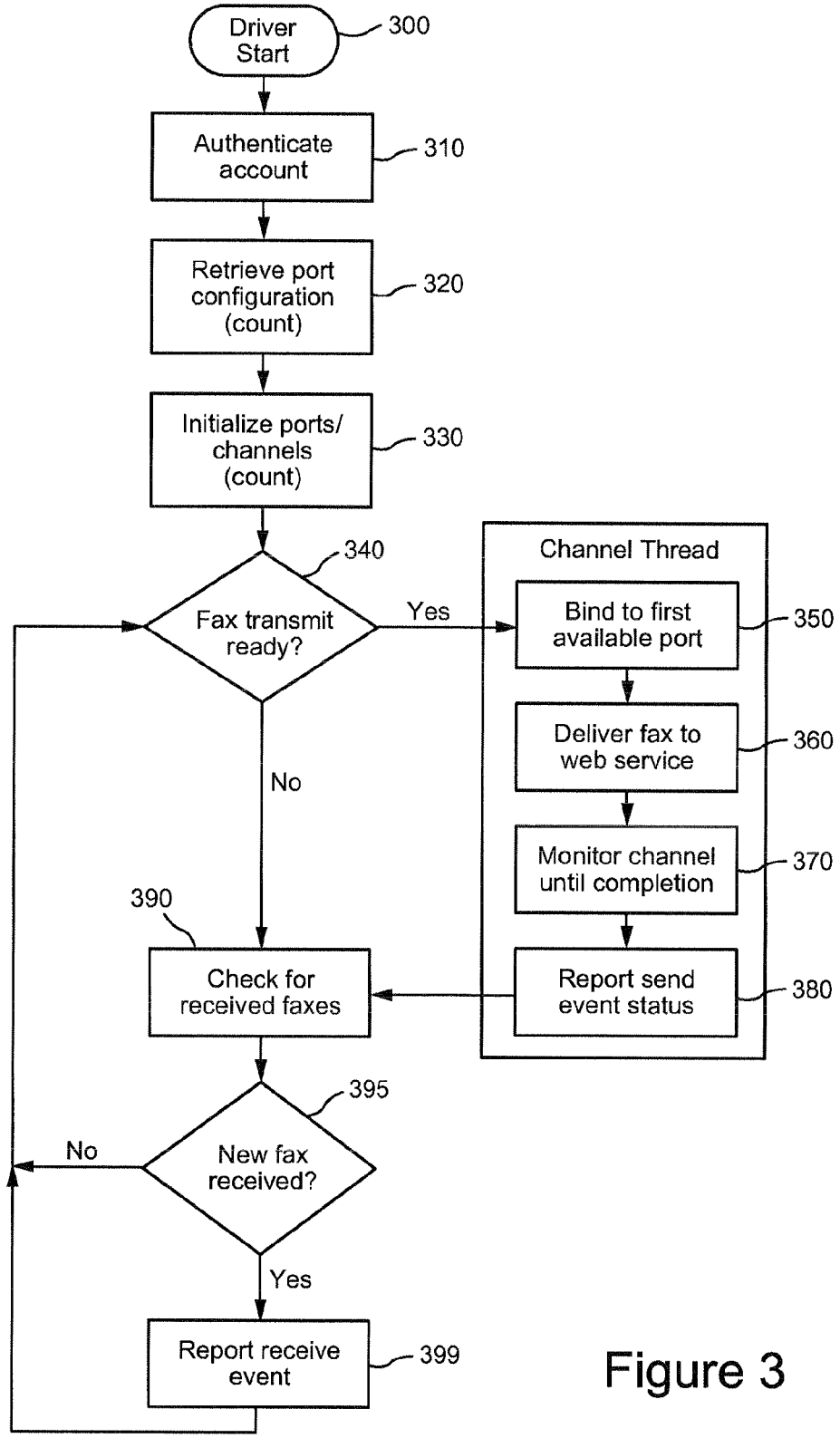
FIG. 3 is a schematic diagram depicting the etherFAX® virtual fax driver (web client) according to an embodiment of the invention.

In one exemplary embodiment, the internal operations of the etherFAX® virtual fax driver (210) described in FIG. 3 operates as in the following manner. At device startup time, the virtual driver startup routine (300) is executed. During startup, the driver accesses its configuration information that enables it to determine which of the at least one etherFAX® cloud data centers (260) it may establish communications to. Additional parameters, such as authentication credential information, retry logic, or other policy information such as time of operations, quality of service, priority, time offset for bulk transfers, etc. may also be accessed at this time. It may also check to see if it has the necessary access to the appropriate data channels to establish communications with the configured etherFAX® cloud data centers (260). If the configuration information is invalid, or access to the appropriate data communication channels is not operational, the etherFAX® virtual fax driver (210) may be configured to alert the system administrator that there is an issue through a variety of ways, including but not limited to email, SMS, and or system event log messaging.

If enough of the parameters pass startup self test to allow instantiation of communications with etherFAX® cloud data centers (260), the etherFAX® virtual fax driver (210) may proceeds to authenticating the etherFAX® account (310). The etherFAX® virtual fax driver (210) instantiates the appropriate communications with the etherFAX® cloud data centers (260), and exchanges the authentication credential information. If the credential information fails, the etherFAX® virtual fax driver (210) may be configured to alert the system administrator through the previously enumerated methods, and await further interaction with the administrator. As exemplified by prior art, any outbound facsimile information transferred to fax server (200) may be queued by fax server (200), and await corrective action from the system administrator.

If authentication succeeds, the etherFAX® virtual fax driver (210) proceeds to step (320) to retrieve the number of allocated ports associated with the account. The number of ports associated with the account that are retrieved can be loosely associated with the number of concurrent telephone service provider lines that may be connected to the fax server (200) as exemplified by prior art. Once the port parameters are established, the etherFAX® virtual fax driver (210) proceeds to step (320) to initialize the port/channels thus allowing more than one stream of facsimile communications to occur simultaneously to accommodate the organizations work load. If initialization of the ports/channels (320) results in an error situation, the etherFAX® virtual fax driver (210) may be configured to alert the system administrator through the previously enumerated methods, and await further interaction with the administrator. Upon successful instantiation of the virtual ports/communication channels, the etherFAX® virtual fax driver (210) enters its main loop of operations. Conceptually the main loop of operations consists of two threads of operation: one for transmission of facsimile information and the other for reception of facsimile information. It is to be appreciated that these operations can be executed either serially, in parallel, as well as handling more than one operation at a time based on the environment that the etherFAX® virtual fax driver (210) is implemented in and the number of virtual ports/channels assigned to the organization. In the most limited case, the main loop consists of serially checking if there is facsimile information to be transmitted to the at least one facsimile peer system (290) and if there is facsimile information to be received from the facsimile peer system (290). The precedence order of checking the status of the operation (340, 390) may be implementation specific and not consequential to the spirit of the exemplary embodiment. In a more advanced environment, each operation may happen in parallel, and the order of checking the status may happen asynchronously to one another.

In the event the checking of status indicates that work needs to be accomplished, the etherFAX® virtual fax driver (210) determines the appropriate next step of operation. If facsimile information is ready for transmission, the etherFAX® virtual driver (210) continues to step (350). At this point, the etherFAX® virtual driver (210) binds itself to the first available port (350) and delivers the facsimile information (360) to the etherFAX® cloud data center (260). The etherFAX® virtual driver (210) continues to step (370), and monitors the status of the facsimile transmittal until the termination of the request. Upon termination of the request, the etherFAX® virtual driver (210) proceeds to step (380) and checks the status of the operation. If an error occurs, the etherFAX® virtual driver (210) may take corrective action as describe previously, and/or may propagate the error back to the originating application (230,250) or device (240). Upon successful completion, the status may also be propagated back to the originating application (230,250) or device (240).

If checking the status indicates that facsimile information is ready to be received (390), the etherFAX® virtual driver (210) proceeds to step (395) and instantiates the appropriate communications to receive the facsimile information from the etherFAX® cloud data center (260). The etherFAX® virtual driver (210) consumes the inbound facsimile information along with the status of the operations. Upon termination of the request, depending on the status of the operation, the facsimile information may be queued by the fax server (200), signaled to the intended recipient (399) via an appropriate electronic format, or in the case of an error, the status of the operation may be propagated back to application (230,250) or device (240) for further processing.

Additionally the status of either operation may be also logged to a system event logger, and depending on the severity of the termination of the request, the status may be indicated back to the administrator through the previously enumerated methods to initiate any appropriate corrective action.

Figure 4:
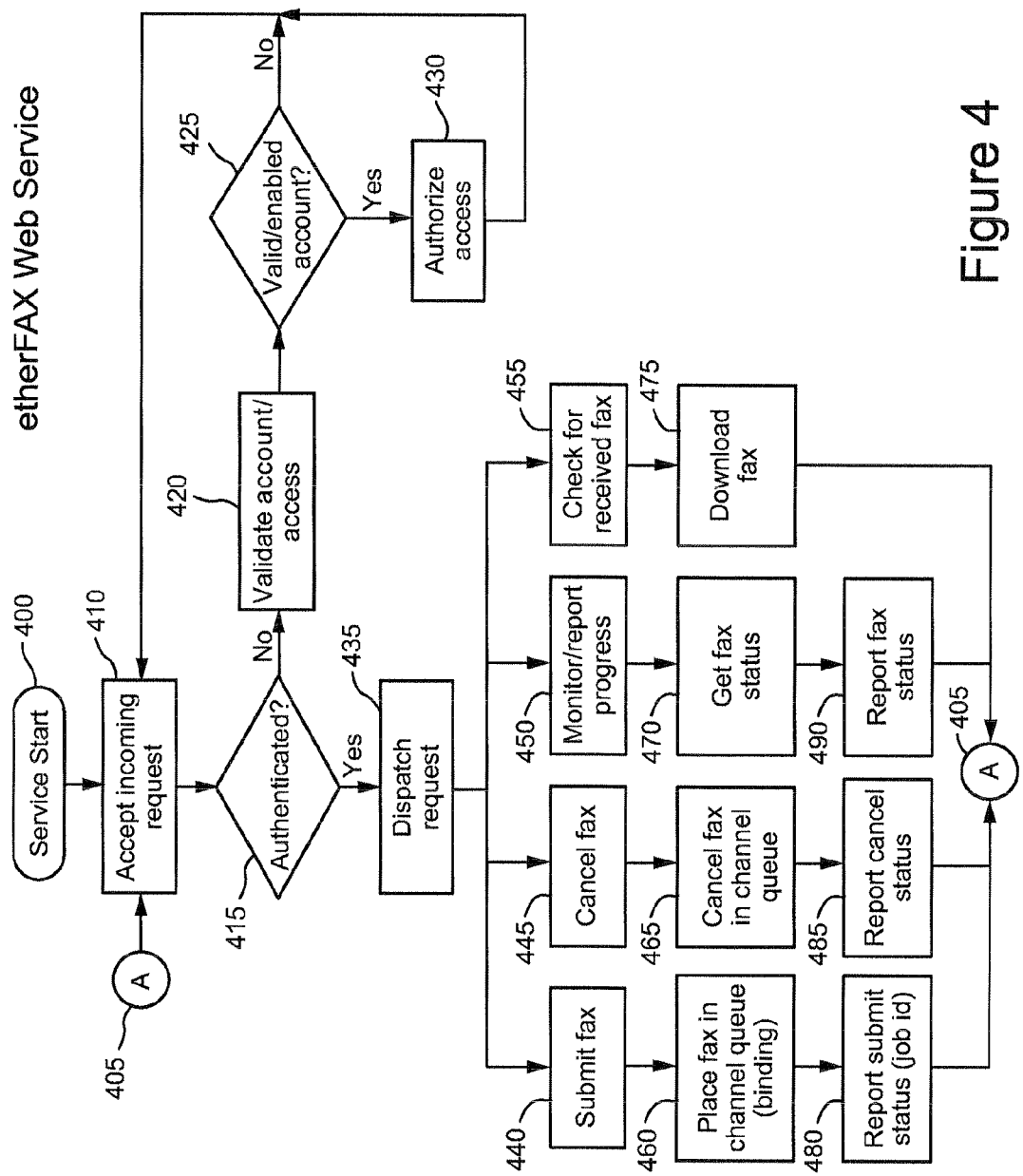
FIG. 4 is a schematic diagram depicting the etherFAX® service interface (web services) according to an embodiment of the invention.

In an exemplary embodiment of the present invention, FIG. 4 (etherFAX® Web Service), illustrates the service interface exposed over the at least one data network interconnect to at the at least one etherFAX® cloud data center (260). At startup of the service (400), the etherFAX® Web Service initializes itself to enable the acceptance of inbound communications from the at least one fax server (200). Once all resources are allocated (HTTP(S) listeners, etc.), the etherFAX® Web Service proceeds to step (410) and awaits inbound connections at step (405). Upon indications of an inbound facsimile communications, the etherFAX® Web Service proceeds to step (410) to accept incoming connections. Once the inbound communications is instantiated, etherFAX® Web Service proceeds step (415) to determine if the connection was previously authenticated. It is to be appreciated that there are many alternative methods of (re)instantiating communications between fax server (200) and the etherFAX® cloud data center (260). In one embodiment, persistent HTTP(S) connections may be instantiated enabling the authentication process to happen periodically and only when the connection times out, allowing the etherFAX® Web Service to proceeds to step (415). However, it is also to be understood, that authentication may happen on each instantiation of communications between fax server (200) and the etherFAX® cloud data center (260) depending on the communications methodology used. If the connection is not authenticated, the etherFAX® Web Service process proceeds to step (420) to validate the incoming authentication credentials. At step (425), the etherFAX® Web Service authenticates the credentials against the etherFAX® account information. If there is an error authenticating the inbound communications session, an error is returned to the initiating party, and the etherFAX® Web Service returns to step (410) and awaits further inbound requests.

If the authentication process succeeds, the etherFAX® Web Service continues to step (435) to dispatch the inbound request. The request can be one of a number of different operations either related to the communications of facsimile information or command, control, or status of the etherFAX® account. For the sake of clarity, FIG. 4 has only illustrated the high level operations of submitting facsimile information (440), canceling a facsimile operation (445), monitor/reports progress of a facsimile operation (450), and/or checking for received/inbound facsimile information (455). It is to be understood by those schooled in the art that the listed operations are to be construed as non limiting, as other operations such checking the etherFAX® account balance, determining number of faxes transmitted and received, changing account credentials, etc. can also be access through the etherFAX® Web Service interface. Furthermore, it is to be appreciated that the well-known and standard model of web services is only one exemplary embodiment of a protocol used to enable distributed processing of between cooperating peer computing systems. Other remote procedure call technologies can also be used to accomplish similar results.

In the exemplary embodiment, the requested operation can be thought of as a job object, transaction, or work request. To submit facsimile information for subsequent transmittal work request (440), the etherFAX® Web Service process proceeds to step (460) and passes the submitted work request to the etherFAX® Board server process illustrated in FIG. 5. The etherFAX® Web Service process then proceeds to step (480) and returns that status of the submit work request to the calling peer. The process then returns to step (405) and awaits additional incoming work requests.

Similarly, if the requested operation is to cancel (445) a previously submitted fax work request, the etherFAX® Web Service dispatcher continues to step (465) and contacts the etherFAX® Board server process to cancel a previously submitted work request. If previously submitted facsimile work request is pending or in progress, the etherFAX® Board server will try and terminate the work request depending at what stage of communications it is in with the at least one peer facsimile system (290). If the transaction has already be completed before the cancel work request is recognized by the etherFAX® Board server process, the cancel operation will fail. In either case, the appropriate status will be returned (490) to the calling peer, indicating the status of the transaction of interest as well as the status operation itself. The process then returns to step (405) and awaits additional incoming work requests.

A consumer of the etherFAX® Web Service may also want to monitor (450) the progress of a previously submitted or the current operation of a transaction that is in progress. In these cases, the etherFAX® Web Service dispatcher continues to step (470) and contacts the etherFAX® Board server process to get the current status of the specific work request. Once the status is received, the etherFAX® Web Service process proceeds to step (490) and returns the appropriate status information based on the type work request that was of interest.

To receive facsimile information from the one etherFAX® cloud data center (260), the calling peer contacts the etherFAX® Web Service to check for inbound (455) facsimile communications. If there is any inbound facsimile information waiting, the etherFAX® Web Service process proceeds to step (475) to transfer the information from the etherFAX® Web Service to the calling peer. The transferred information also contains ancillary information associated with the facsimile data, including but not limited to such as the originating phone number (if available), network identifier, length, and/or error/success status. After the transfer is completed, the etherFAX® Web Service process returns to step (405) waiting for additional work request.

It is to be understood that in the precedence order of dispatching the requested operation (440,445,450,455) may be implementation specific and not consequential to the spirit of the exemplary embodiment. In a more advanced environment, each operation may happen in parallel, and the order of operation may happen asynchronously to one another.

Figure 5:
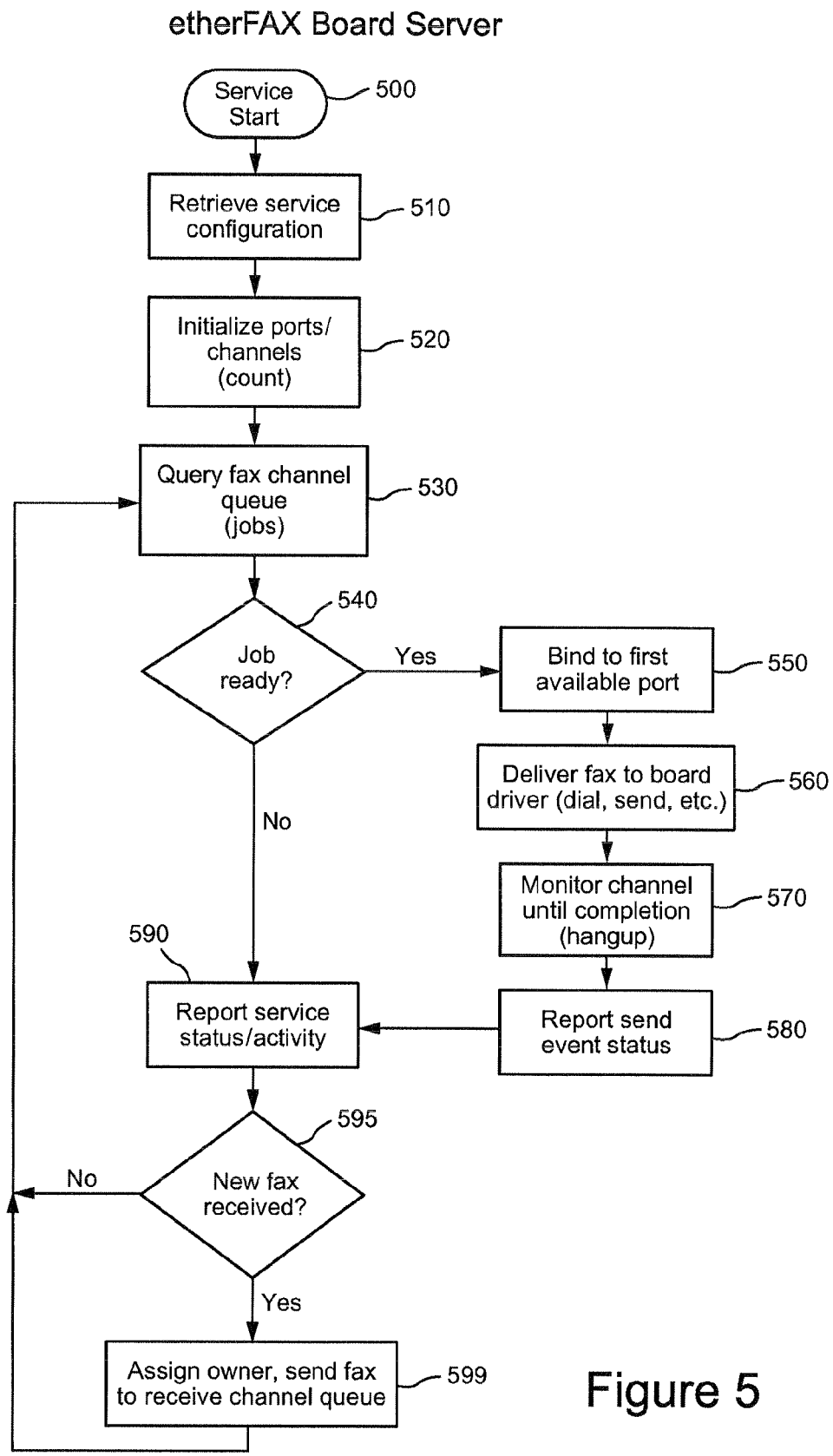
FIG. 5 is a schematic diagram depiction the etherFAX® fax board server according to an embodiment of the invention.

In an exemplary embodiment of the present invention, FIG. 5 (etherFAX® Board Server), illustrates the service interface exposed to send and accept facsimile information via telephony service providers (280) from the at least one facsimile peer system (290). It also illustrates the exposed interface for exchanging work requests with the etherFAX® Web Service process. At startup of the service (500), the etherFAX® Board Server process initializes itself and proceeds to step (510) to retrieve its service configuration information. If there is any error in the configuration information that prevents the etherFAX® Board Server process from proceeding, it logs a message and exits, awaiting correct action from the administrator.

Upon acceptance of the configuration information, the etherFAX® Board Server process continues to step (520) and initializes the facsimile communications hardware that enables sending and receiving facsimile information from the at least one facsimile peer system (290) via telephony service providers (280). It is to be understood that the facsimile communications hardware may be capable of handling communications with more than one facsimile peer system (290) simultaneously. Each concurrent communications stream that can be handled can be considered a separate port or channel, as well known to ones schooled in the art. If an error occurs during the initialization phase of the hardware, the etherFAX® Board Server process logs a message for the administrator. Depending on the severity of the error condition, the etherFAX® Board Server process may also exit and await corrective action before it can be restarted.

Once the etherFAX® Board Server process has initialized the facsimile hardware under its control, it enters its main loop at step (530). At this point the etherFAX® Board Server process is waiting to receive work requests from the etherFAX® Web Service process or receive indications from the facsimile hardware. Once a work request is passed to the etherFAX® Board Server process, it validates whether or not the transaction is ready to be processed at step (540). If not it returns to step (530) awaiting a valid request. If the work request ready and it is to send facsimile information to the at least one facsimile peer system, the etherFAX® Board Server process proceeds to step (550). At this point the etherFAX® Board Server process binds to the most appropriate channel to use to send the facsimile information over. It then delivers tie facsimile information to the facsimile hardware, along with other necessary information, such as but not limited to, phone number or network identifier of the at least one peer facsimile system, color or black and white, caller subscriber identifier, etc., that are needed to establish the appropriate communications with the peer system.

In an embodiment of the etherFAX® Board server process, due to the aggregation of facsimile hardware and the interconnection with the at least one telephony service provided (280) during transmittal of the facsimile information the etherFAX® Board server process will try and configure the origination network identifier or phone number to be consistent with the originating organizations information for caller ID purposes. It also takes care to maintain that the caller subscriber identifier (CSID) is included as part of the outbound facsimile information.

Once this information is passed to the facsimile hardware, it instantiates the necessary communications with the at least one peer facsimile system (290). During this time the etherFAX® Board Server process proceeds to step (570) and monitors the status of the operation. If the operation successfully completes the transfer of the facsimile information to the at least one peer facsimile system (290), the etherFAX® Board Server process continues to step (580) and logs an audit message tracking the status of the send transaction. At step (590), the etherFAX® Board Server process completes the work request and allowing the etherFAX® Web service process to query its successful status.

A multitude of error can also occur, including but not limited to, no answer, busy, peer unavailable do to no paper, out of ink/toner, etc. Other communication errors could occur where communications is terminated during the middle of the transfer. Depending on the severity of the error, etherFAX® account configuration, etc., corrective action that where enumerated previously may be executed locally by the etherFAX® Board. Server process. Other error status may have to be handled by the originating peer. In either case, upon determination by the etherFAX® Board Server process has finished handling the specific transaction, it proceeds to step (580) and logs a message for the administrator. The work request is then completed at (590) allowing the etherFAX® Web service process to query its status. At this point the etherFAX® Board Server process may check if any inbound facsimile information is to be received. If not, the etherFAX® Board Server process returns to step (530) and waits for further work to do.

If an inbound facsimile information is received, the etherFAX® Board Server process proceeds to step (595) check the status of the inbound communications. If the facsimile information is ready to be consumed, the etherFAX® Board Server process looks up the associated etherFAX® account the incoming facsimile information is destine for. It then assigns an owner and a channel to the communications, thus allowing the inbound facsimile information to be received. Once the facsimile information is successfully received, the etherFAX® Board Server process logs an audit message and completes the transaction allowing the etherFAX® Web Service process to query the state of the received facsimile information.

A multitude of error can also occur, including but not limited to, no channels available, no account, account suspended, etc. Other communication errors could occur where communications is terminated during the middle of the transfer. Depending on the severity of the error, etherFAX® account configuration, etc., corrective action may be executed locally by the etherFAX® Board Server process. Other error status may have to be handled by the originating peer facsimile system (290). In either case, upon determination by the etherFAX® Board Server process that it has finished handling the specific receive operation, it logs a message for the administrator. The job is then completed at (599) allowing the etherFAX® Web service process to query its status. At this point, the etherFAX® Board Server process returns to step (530) and waits for further work to do.

It is to be understood that in the precedence order of checking the status of the operation (540,595) may be implementation specific and not consequential to the spirit of the exemplary embodiment. In a more advanced environment, each operation may happen in parallel, and the order of checking the status may happen asynchronously to one another.

It is to be understood that within an etherFAX® cloud data center (260), their may be more that one etherFAX® Web Service processes running, thus enabling the system to process more than one request at a time. The processed be deploy as separate threads in a single computer process, multiple instances of the processes on a single computer system, or across multiple computer systems, whether they be operating in a virtual machine environment or not.

Furthermore it is to be understood that within an etherFAX® cloud data center (260), their may be more that one etherFAX® Board Server processes running, thus enabling the system to process more than one request at a time. The processed be deploy as separate threads in a single computer process, multiple instances of the processes on a single computer system, or across multiple computer systems, whether they be operating in a virtual machine environment or not.

Additionally, the etherFAX® Web Service and etherFAX® Board Server may be running of different computer systems, whether they be operating in a virtual machine environment or not as the interface between the services may be accomplish thorough a web service interface or other suitable remote procedure call mechanism. Furthermore the different computer systems housing each server may be geographically or logistically dispersed for a variety of reasons, including but not limited to redundancy, capacity, and/or cost.

Embodiments of the present invention may be implemented in hardware, software, firmware, or combinations thereof.

Embodiments of the present invention may also be deployed in multiple devices or in a single device.

Embodiments of the present invention may also be configured wherein elements of fax server technology and/or the etherFAX® virtual driver (210) may be implemented totally within general applications (230), purpose built applications (250) and/or devices (240), thus not requiring the services of a intermediary fax server (200). These modifications allow for communications to happen between general applications (230), purpose built applications (250) and/or devices (240) and the etherFAX® cloud data center (260).

It will be readily understood by those schooled in the art that the present invention enables additional advantage that may be realized by an organization or customer, as they can now avail themselves of the aggregated services offered by the etherFAX® cloud data center (260), providing them access to solutions not previously available with increased economies of scale. Without these advantages set forth, the total cost of replicating these services by the customer or organization may be cost prohibitive, potentially putting an organization or customer at a competitive disadvantage.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

While the foregoing illustrates and describes exemplary embodiments of this invention, it is to be understood that the invention is not limited to the construction disclosed herein. The invention can be embodied in other specific forms without departing from its spirit or essential attributes.

We claim:

1. In a distributed computing model, a facsimile communications environment comprising:
 a facsimile communications service shared by one or more cooperating facsimile capable systems, the facsimile communications service configured to establish connections with and communicate information between at least one cooperating facsimile capable system and at least one peer facsimile capable system to enable the at least one cooperating facsimile capable system and the at least one peer facsimile capable system to exchange facsimile information via the service, the facsimile communications service being accessible via at least one data network interconnect;
 the facsimile communications service comprising:
  at least one aggregated facsimile communications interconnect;

a port and/or channel communicator configured to communicate with the at least one cooperating facsimile capable system over a data network interconnect;

at least one processor that detects (a) send requests from the at least one cooperating facsimile capable system, and (b) status indications from the at least one aggregated facsimile communications interconnect, the at least one processor, in processing a send request, being structured to perform operations comprising:

(1) obtaining from the at least one cooperating facsimile capable system at least one phone number and/or network identifier of the at least one peer facsimile capable system to send to, (2) selectively binding to a channel provided by the port and/or channel communicator to receive transmission information from the at least one cooperating facsimile capable system, and (3) transmitting the received transmission information via the at least one aggregated facsimile communications interconnect to the at least one peer facsimile capable system, the at least one processor, upon detecting indications from the at least one aggregated facsimile communications interconnect: (i) associating the at least one phone number and/or network identifier with the received facsimile transmission information and (ii) communicating the received transmission information to the at least one peer facsimile capable system via the at least one aggregated facsimile communications interconnect.

2. The facsimile communications environment of claim 1 wherein the port and/or channel communicator communicates over the Internet with plural cooperating facsimile capable systems.

3. The facsimile communications environment of claim 1 wherein the at least one aggregated facsimile communications interconnect is configured to simultaneously communicate with multiple different peer facsimile capable systems.

4. The facsimile communications environment of claim 1 wherein the at least one processor configured to associate an origination network identifier and/or phone number to be consistent with an originating organizations' information for caller identification purposes, thereby enabling the at least one aggregated facsimile communications interconnect, when authorized, to masquerade as an originating organizations.

5. The facsimile communications environment of claim 1 wherein selectively binding to a channel comprises binding to a most appropriate one of a plurality of channels to use to transmit the received facsimile information over, and transmitting the received transmission information comprises communicating the received transmission information and a caller subscriber identifier via the at least one aggregated facsimile communication interconnect to the at least one peer facsimile capable system.

6. The facsimile communications environment of claim 1 wherein the at least one processor binds to a channel by temporarily assigning a consumer to a channel, thereby allocating shared aggregated facsimile communications interconnect resources for use in handling a request.

7. The facsimile communications environment of claim 1 wherein selectively binding to a channel comprises selecting between a multitude of communications interconnects to enable communications of facsimile status information back to the at least one cooperating facsimile capable system that originated the request.

8. The facsimile communications service of claim 1, wherein the at least one peer facsimile capable system comprises a second cooperating facsimile system.

9. A distributed facsimile communications system shared by at least one cooperating facsimile capable system and at least one peer facsimile capable system, the facsimile communications system configured to establish connections with and communicate information between the at least one cooperating facsimile capable system and the at least one peer facsimile capable system to enable the at least one cooperating facsimile capable system and the at least one peer facsimile capable system to exchange information via the system, the facsimile communications system being accessible via at least one data network interconnect;

the facsimile communications system comprising:

at least one aggregated facsimile communications interconnect;

a communicator configured to communicate with the at least one cooperating facsimile capable system over a data network interconnect; and at least one processor configured to detect receive requests from the at least one cooperating facsimile capable system and status indications from the at least one aggregated facsimile communications interconnect, the at least one processor, in processing a receive request, being structured to perform operations comprising:

(1) obtaining, via the communications established with the at least one peer facsimile capable system facsimile transmission information comprising at least one phone number and/or network identifier of the at least one peer facsimile capable system, (2) selectively binding to a channel provided by the communicator, and (3) transmitting the received facsimile transmission information obtained from communications established with the at least one peer facsimile capable system to the at least one cooperating facsimile capable system via the at least one aggregated facsimile communications interconnect, the at least one processor, upon detecting indications from the at least one aggregated facsimile communications interconnect: (i) associating the at least one phone number and/or network identifier with the received facsimile transmission information and (ii) communicating the received transmission information to the at least one cooperating facsimile capable system via the at least one data network interconnect.

10. The facsimile communications service of claim 9, wherein the at least one peer facsimile capable system comprises a second cooperating facsimile system.

11. The distributed facsimile communications system of claim 9 wherein the at least one aggregated facsimile communications interconnect is configured to simultaneously communicate with multiple different peer facsimile capable systems.

12. The distributed facsimile communications system of claim 9 wherein the at least one processor configured to associate an origination network identifier and/or phone number to be consistent with an originating organizations' information for caller identification purposes, thereby enabling the at least one aggregated facsimile communications interconnect, when authorized, to masquerade as an originating organization.

13. The distributed facsimile communications system of claim 9 wherein selectively binding to a channel comprises binding to a most appropriate one of a plurality of channels to use to transmit the received facsimile transmission information over, and transmitting the received transmission information comprises communicating the received transmission information and a caller subscriber identifier via the at least one aggregated facsimile communication interconnect to the at least one cooperating facsimile capable system.

14. The distributed facsimile communications system of claim 9 wherein the at least one processor binds to a channel by temporarily assigning a consumer to a channel, thereby allocating shared aggregated facsimile communications interconnect resources for use in handling a request.

15. The distributed facsimile communications system of claim 9 wherein selectively binding to a channel comprises selecting between a multitude of communications interconnects to enable communications of facsimile status information back to the at least one peer facsimile capable system.

* * * * *